United States Patent [19]

Davis

[11] 3,986,734
[45] Oct. 19, 1976

[54] WALL MOUNTED RETAINING DEVICE
[75] Inventor: Gordon Jerry Davis, Newton, Iowa
[73] Assignee: The Maytag Company, Newton, Iowa
[22] Filed: Feb. 12, 1976
[21] Appl. No.: 657,378

[52] U.S. Cl. ............................ 285/158; 285/192; 285/305
[51] Int. Cl.[2] .................................. F16L 3/04
[58] Field of Search .......... 285/158, 161, 305, 194, 285/192, 321, 37, 205, 208; 85/8.8; 151/41.75; 403/252, 254, DIG. 7

[56] References Cited
UNITED STATES PATENTS

| | | |
|---|---|---|
| 1,062,635 | 5/1913 | Clements ........................ 403/252 X |
| 1,541,537 | 6/1925 | Thomas .......................... 285/192 X |
| 3,328,054 | 6/1967 | Fecho ............................... 285/194 |
| 3,415,548 | 12/1968 | Goodman et al. .............. 285/194 X |

Primary Examiner—Dave W. Arola
Attorney, Agent, or Firm—Richard L. Ward

[57] ABSTRACT

An assembly for passing an elongated member or members through an aperture in a wall or panel including a collar and a split ring retainer for locking the collar into the panel aperture. In a preferred embodiment the split ring retainer is assembled into an annular groove adjacent the panel for preventing axial movement of the conduit relative to the panel.

12 Claims, 3 Drawing Figures 3,986,734

WALL MOUNTED RETAINING DEVICE

BACKGROUND OF THE INVENTION

1. Field of the Invention

This invention relates generally to supporting an elongated member in an aperture in a wall and, in a particular embodiment, to extending a conduit through the wall and to a retaining device for axially locking the conduit in the aperture.

2. Description of the Prior Art

An assembly of the type described in this application is particularly adapted for use with washing machines. It is common practice to employ a preformed drain hose to conduct liquid from the drain pump through the cabinet wall to a standpipe. A problem long associated with this method, however, has been that of a kinked drain hose within the cabinet.

U.S. Pat. No. 3,328,054 discloses a one piece hose connector for passing a conduit through a panel. This hose connector has guides and abutments for keeping the connector aligned and has a cantilevered spring finger which snaps into the hole to prevent pull through.

Several other United States patents relate to joining and locking a section of heating pipe to a furnace plenum or relate to locking an electrical conduit into an outlet box. The furnace related patents disclose pipes with partial flanges and spring latches or a separate resilient collar having a strap with hinges designed to lock the pipe into an aperture in the furnace plenum. In another patent an electrical conduit is combined with a grooved sheet metal cup and the conduit is pivoted into a knock-out hole in the outlet box with the groove in the cup locking into the wall of the box.

It is believed that a need still exists for an improved assembly for passing an elongated member or conduit through a panel and also for effecting locking of the assembly thereto.

SUMMARY OF THE INVENTION

It is therefore an object of this invention to provide an improved assembly for passing an elongated member through a wall or panel.

It is a further object of this invention to provide a unique retaining device for locking an element into an aperture in a wall or panel.

It is a still further object of this invention to provide a relatively rigid conduit connector which will enable a resilient conduit to pass through a wall or panel without kinking.

The instant invention achieves these objects in a collar construction for passing an elongated member through an aperture in a wall and which is cooperable with a split ring retainer, engageable with a groove in the collar construction, for retaining the collar and the elongated member in the aperture.

Operation of the device and further objects and advantages thereof will become evident as the description proceeds and from an examination of the accompanying sheet of drawings.

BRIEF DESCRIPTION OF THE DRAWINGS

The drawings illustrate a preferred embodiment of the invention with similar numerals referring to similar parts throughout the several views, wherein.

DESCRIPTION OF A PREFERRED EMBODIMENT

Figure 1:
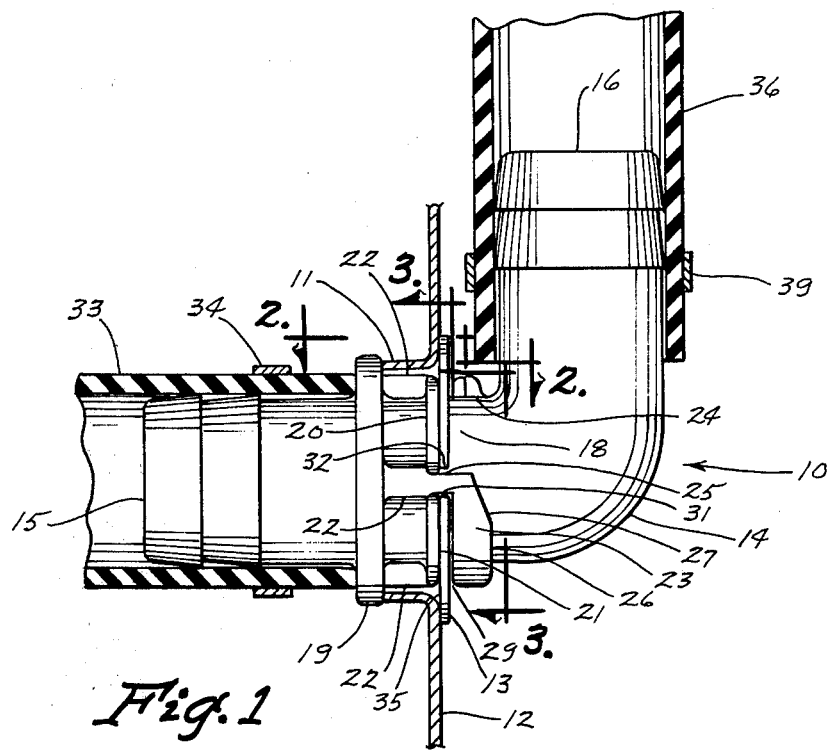
FIG. 1 is a partial section view showing a preferred embodiment of the instant invention.

Referring to the drawings, there is shown a hose coupler assembly 10 extending through a flanged aperture 11 in a wall or panel 12 and being retained in the aperture 11 by a removable split ring retainer 13.

As shown in FIG. 1, a conduit 14 is provided for passing through the flanged aperture 11 in the wall 12. This conduit 14 is generally a right angled elbow with an inlet end 15 relative to the wall 12 and an outlet end 16. Both inlet and outlet ends 15 and 16 are formed with annular serrations on their outside diameter for gripping the inside of a rubber hose. At a point generally intermediate the inlet and outlet ends 15 and 16 of the conduit 14 is a collar construction including a shoulder or abutment 19 which has a diameter substantially larger than the flanged aperture 11 in the wall 12 and engages the edge of the flange for limiting movement of the conduit 14 through the aperture 11. In the embodiment shown, the collar construction is integrally molded with the conduit 14.

In a preferred embodiment, as shown in FIG. 1, a circumferential ring 20 is spaced from the shoulder 19 toward the outlet end 16 of the conduit 14. The outside face 21 of this ring 20 is substantially aligned with the side of the wall 12 so that in an assembled posture the split ring retainer 13 will bear against the circumferential ring 20 and the wall 12.

A plurality of equally spaced longitudinal ribs 22 extend radially from the outside diameter of the conduit 14 and axially between the circumferential ring 20 and the shoulder 19. These ribs 22 are spaced so that the diameter across any two ribs is approximately equal to the diameter of the aperture 11 in the wall 12. These ribs 22 along with the circumferential ring 20 serve to maintain the conduit 14 centered in the aperture 11.

Figure 3:
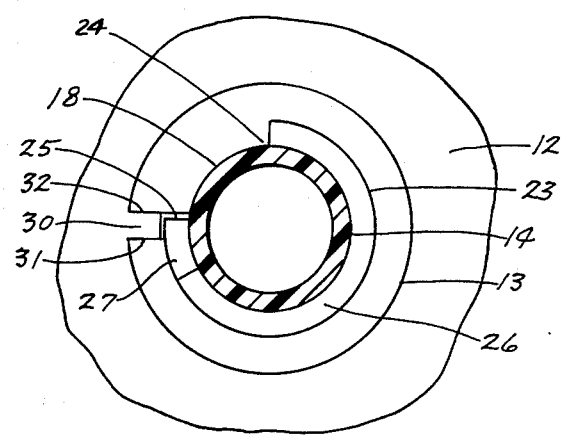
FIG. 3 is a view taken principally along lines 3—3 of FIG. 1.

Spaced still further toward the outlet end 16 of the conduit 14 is a partial circumferential ring 23. As shown in FIG. 3, this partial ring 23 extends in a clockwise direction around the circumference of the conduit 14 from a 12 o'clock position 24 to approximately a nine o'clock position. At this nine o'clock position the partial ring 23 terminates and an axial web or stop 25, as best shown in FIG. 1 and having a width approximating that of the ribs 22, extends back to the full circumferential ring 20. The partial circumferential ring 23 thus defines at least one open portion or recess 18 around its circumference for gaining entry into the groove 29 between the rings 20 and 23. As shown in FIG. 1, the outside face 26 of the partial circumferential ring 23 has a sloping portion 27 that tapers toward the first ring 20 as an aid for deforming the split ring retainer 13 in assembly or disassembly.

As shown in the drawings the outside diametes of the full circumferential ring 20, the partial circumferential ring 23 and the diameter across the ribs 22 are approximately equal in diameter but smaller than the aperture 11.

Figure 2:
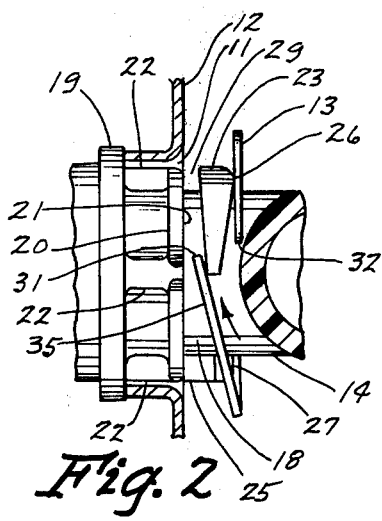
FIG. 2 is a view taken principally along lines 2—2 of FIG. 1.

As indicated in FIGS. 1 and 2, a groove 29 is defined between the full and partial circumferential rings 20 and 23. This groove 29 has a root diameter substantially equal to the outside diameter of the conduit 14 and will be further discussed herein.

As best shown in FIGS. 2 and 3, a split ring retainer 13 is used to axially lock or retain the conduit 14 in the aperture 11. The retainer 13 is formed from a resilient material and is generally annular in shape. The outside diameter of the retainer 13 is larger in diameter than the shoulder 19 of the conduit 14 and the inside diameter is slightly larger than the outside diameter of the conduit 14. The retainer 13 has a thickness approximating but smaller than the width of the groove 29 between the two circumferential rings 20 and 23 as shown in FIG. 1. A segmental section 30 of the retainer 13 is removed to form a split ring with one end that will become the leading edge 31 during assembly and the other end which will become the trailing edge 32. When assembled, the split segmental section 30 of the retainer 13 is locked between the axial web or stop 25 as shown in FIG. 1.

The assembly of the device in a preferred embodiment is shown in the drawings and proceeds generally as follows: The drain hose 33 from the washer is assembled to the inlet end 15 of the conduit 14 with a hose clamp 34 as shown in FIG. 1. The conduit 14 is next inserted through the flanged aperture 11 in the wall 12 until the shoulder 19 contacts the flanged aperture 11 as shown in FIG. 1. The split ring retainer 13 is placed onto the conduit 14 from the outlet end 16. The retainer 13 is assembled into the groove 29 by deforming it along the sloping portion 27 of the partial circumferential ring 23 to the leading edge 31 into the groove 29, and rotating the retainer 13 in the direction of the arrow in FIG. 2. Rotation is continued until the leading edge 31 contacts the web or stop 25 and the trailing edge 32 drops into the groove 29. In this position, as shown in FIG. 1, the inside face 35 of the retainer is juxtaposed the outside face 21 of the first circumferential ring 20 and the wall 12. With the split segmental section 30 of the retainer 13 locked between the stop 25, as shown in FIG. 1, the retainer 13 is restrained from rotation in either direction. To complete the assembly a second hose 36 is secured to the outlet end 16 of the conduit 14 with a hose clamp 39.

To disassemble the unit from the wall 12, the second hose 36 is disconnected and the trailing edge 32 of the retainer 13 is deformed to start it onto the sloping portion 27 of the partial circumferential ring 23 and rotate in an opposite direction. Once the retainer 13 has been removed the assembly 10 can be removed from the aperture 11.

Although the assembly as shown in the drawings is free to rotate in the aperture 11 when the hoses 33 and 36 are not secured, a slot and tab arrangement may be provided to prevent this rotation. Further, the axial web 25 as shown in this embodiment may be deleted to allow the retainer 13 to rotate in the groove 29 and not change the retaining function.

While the invention has been described in connection with a fluid conduit, it should be understood that this method of retaining an elongated member in a wall 12 may be applied to other configurations such as shafts, rods, wire or wire bundles and many others.

It can be seen that the present invention provides a wall mounted coupler assembly 10 for passing a resilient conduit through an aperture 11 in a wall 12 with ease and without kinking. The assembly 10 is retained in the aperture 11 with a minimum of axial movement.

In the drawings and specification there has been set forth a preferred embodiment of the invention and although specific terms are employed these are used in a generic and descriptive sense only and not for purpose of limitation. Changes in form and proportion of parts, as well as the substitution of equivalents, are contemplated, as circumstances may suggest or render expedient, without departing from the spirit or scope of this invention as defined in the following claims.

I claim:

1. An assembly for passing an elongated member through an aperture in a wall, the combination comprising: a wall with an aperture therein and an elongated member, means generally surrounding said elongated member including flange means effectively defining a first shoulder engageable with one side of said wall, first peripheral means axially adjacent said first shoulder and having a diameter approximating the diameter of said aperture for passing therethrough, and second peripheral means defining a second shoulder having an effective diameter not exceeding the diameter of said aperture and spaced axially from said first peripheral means to establish, with said first peripheral means, a groove adjacent the opposite side of said wall, said second peripheral means including a recess defining an entrance into said groove; and a generally annular split ring retainer having an inner diameter generally greater than the root diameter of said groove and less than the effective outside diameter of said second peripheral means and an outer diameter greater than the diameter of said aperture, the ends of said split ring retainer defining a leading and a trailing edge, said retainer being deformable for starting said leading edge through the recess in said second peripheral means and into said groove and being rotatable until said trailing edge drops into said groove to retain said elongated member in said aperture.

2. An assembly as defined in claim 1 wherein said flange means and said first and second peripheral means are fixed to said elongated member.

3. An assembly as defined in claim 2 wherein said flange means and said first and second peripheral means are formed integrally with said elongated member.

4. An assembly as defined in claim 1 wherein said assembly further includes an axially extending web between said first and second peripheral means to define a stop in said groove for locking said retainer in a non-rotating posture.

5. An assembly for passing an elongated member through an aperture in a wall, the combination comprising: a wall with an aperture therein and an elongated member, means generally surrounding said elongated member including a shoulder engageable with one side of said wall, first peripheral means extending axially from said shoulder and having a diameter generally corresponding to the diameter of said aperture for passing therethrough, second peripheral means having a diameter approximating the diameter of said first peripheral means and spaced axially from said first peripheral means to establish a groove adjacent the opposite side of said wall, and an axially extending web between said first and second peripheral means to define a stop in said groove, said second peripheral means including a recess defining an entrance into said groove; and a generally annular split ring retainer having an inner diameter generally greater than the root diameter of said groove and less than the effective outside diameter of said first and second peripheral means and an outside diameter greater than the diameter of said aperture, the ends of said split ring retainer defining a leading and a trailing edge, said retainer being deformable for starting said leading edge through the recess in said second peripheral means and into said groove and being rotatable until said leading edge contacts said stop and said trailing edge drops into said groove to retain said elongated member in said aperture.

6. An assembly as defined in claim 5 wherein said split ring retainer is of a resilient material and has thickness substantially equal to the width of said groove.

7. An assembly as defined in claim 5 wherein said split ring retainer includes a radial recess approximating the width of said web whereby said retainer is restrained from rotating in either direction when said leading edge contacts said stop and said trailing edge is in said groove.

8. A hose coupler assembly for passing a fluid conduit through an aperture in a wall of an appliance, the combination comprising: a wall with an aperture therein and a fluid conduit, said conduit passing through said aperture in said wall and including an inlet end communicating with an appliance on the inside of said wall and further including an outlet end extending through said wall; a shoulder located generally intermediate said inlet and outlet ends of said conduit engageable with said wall; a first peripheral means extending axially from said shoulder and having a diameter generally corresponding to the diameter of said aperture; a second peripheral means having a diameter approximating the diameter of said first peripheral means spaced axially from said first peripheral means to establish a groove adjacent the opposite side of said wall, said second peripheral means extending partially around said conduit and including a recess defining an entrance into said groove and an axially extending web between said first and second peripheral means spaced angularly from said recess to define a stop; and a generally annular split ring retainer of a resilient material having an inner diameter generally greater than the root diameter of said groove and less than the outside diameter of said first and second peripheral means and an outer diameter greater than the diameter of said aperature, the ends of said split ring retainer defining a leading and a trailing edge, said retainer being deformable for starting said leading edge through said recess and into said groove and being rotatable until said leading edge contacts said stop and said trailing edge drops into said groove to retain the coupler assembly in said aperture.

9. A hose coupler assembly as defined in claim 8 wherein said first peripheral means includes a plurality of axially extending ribs defining a diameter for maintaining said conduit generally centered in said aperture.

10. A hose coupler assembly as defined in claim 8 wherein said first peripheral means includes a face substantially aligned with said opposite side of said wall to provide a guide for said leading edge of said split ring retainer.

11. A hose coupler assembly as defined in claim 8 wherein said second peripheral means includes a sloping portion adjacent said stop to facilitate assembly and removal of said split ring retainer.

12. A hose coupler assembly as defined in claim 8 wherein the outside diameter of said conduit is substantially the same as the root diameter of said groove.

* * * * *